July 7, 1970  R. V. BARDELL  3,519,163
CONTAINER AND CLOSURE THEREFOR
Filed Dec. 3, 1968  4 Sheets-Sheet 1
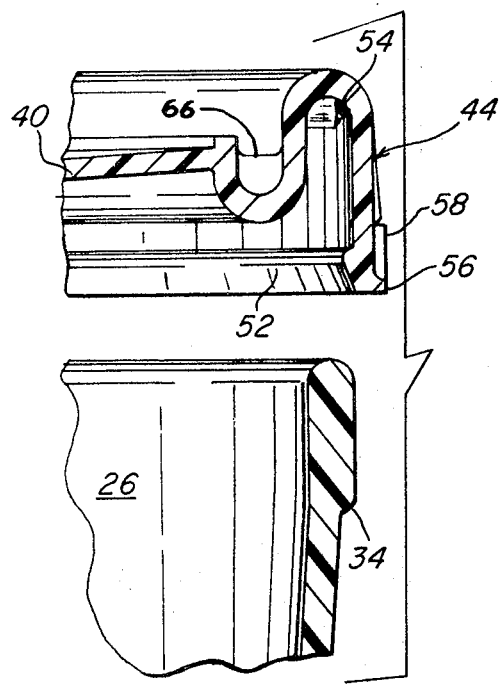
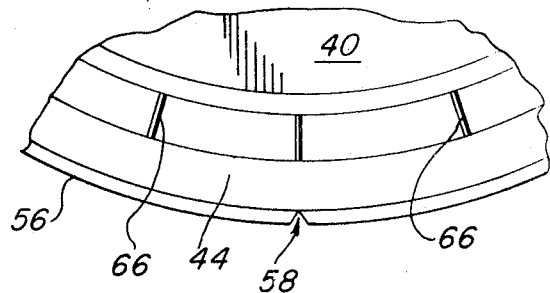
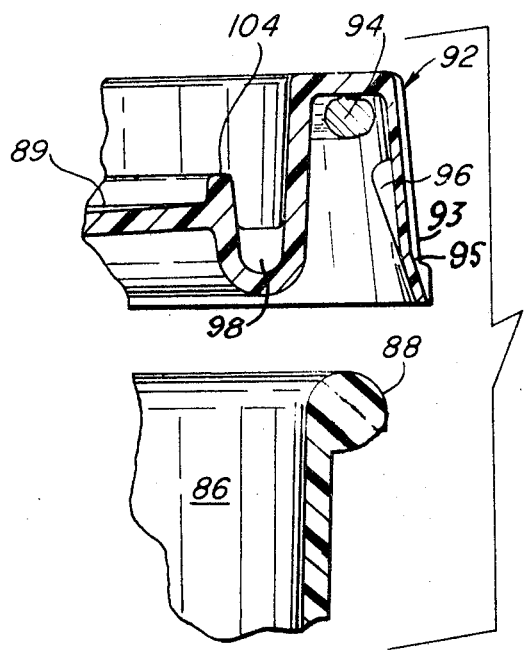
INVENTOR
RALPH V. BARDELL
BY

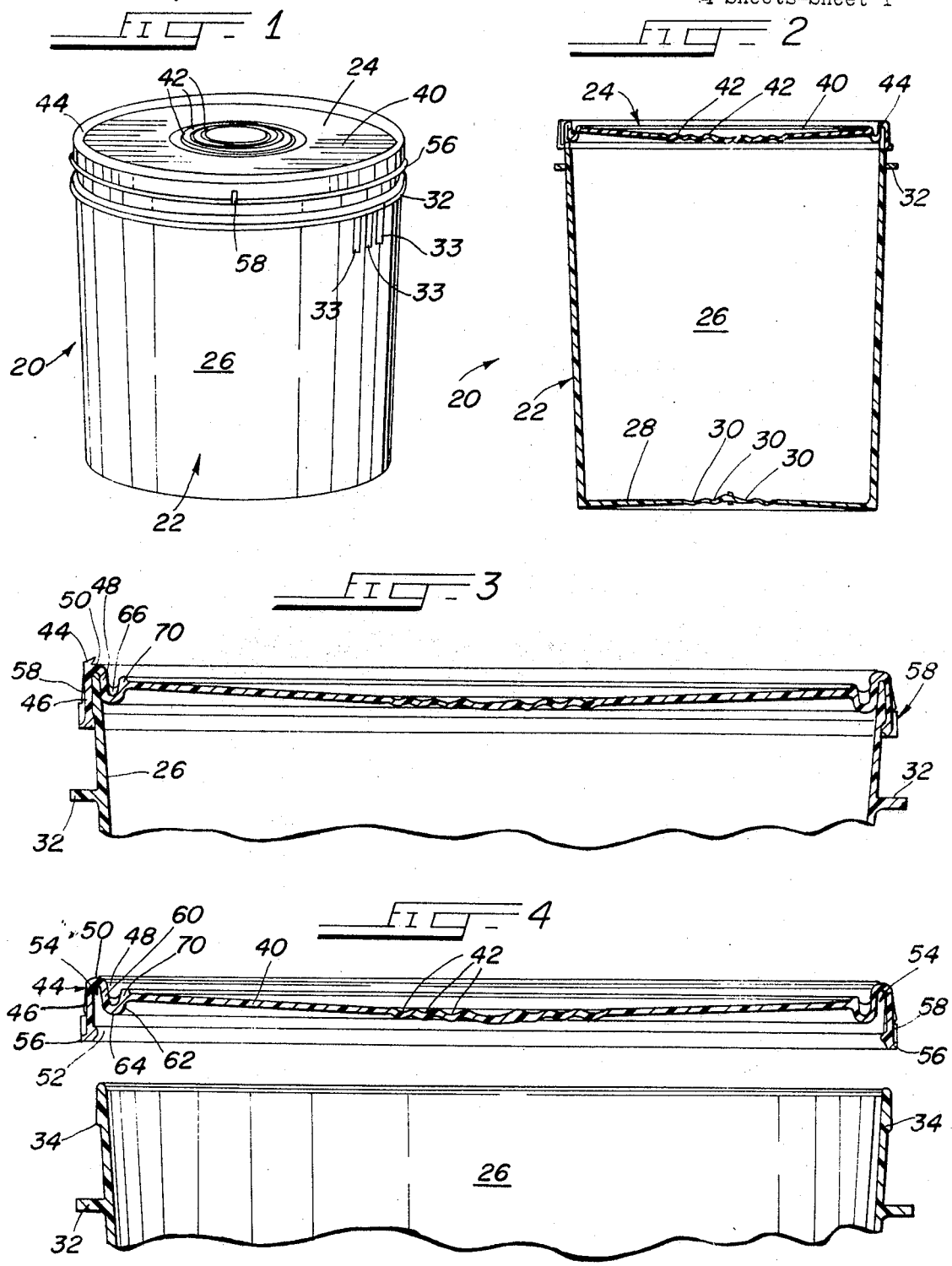

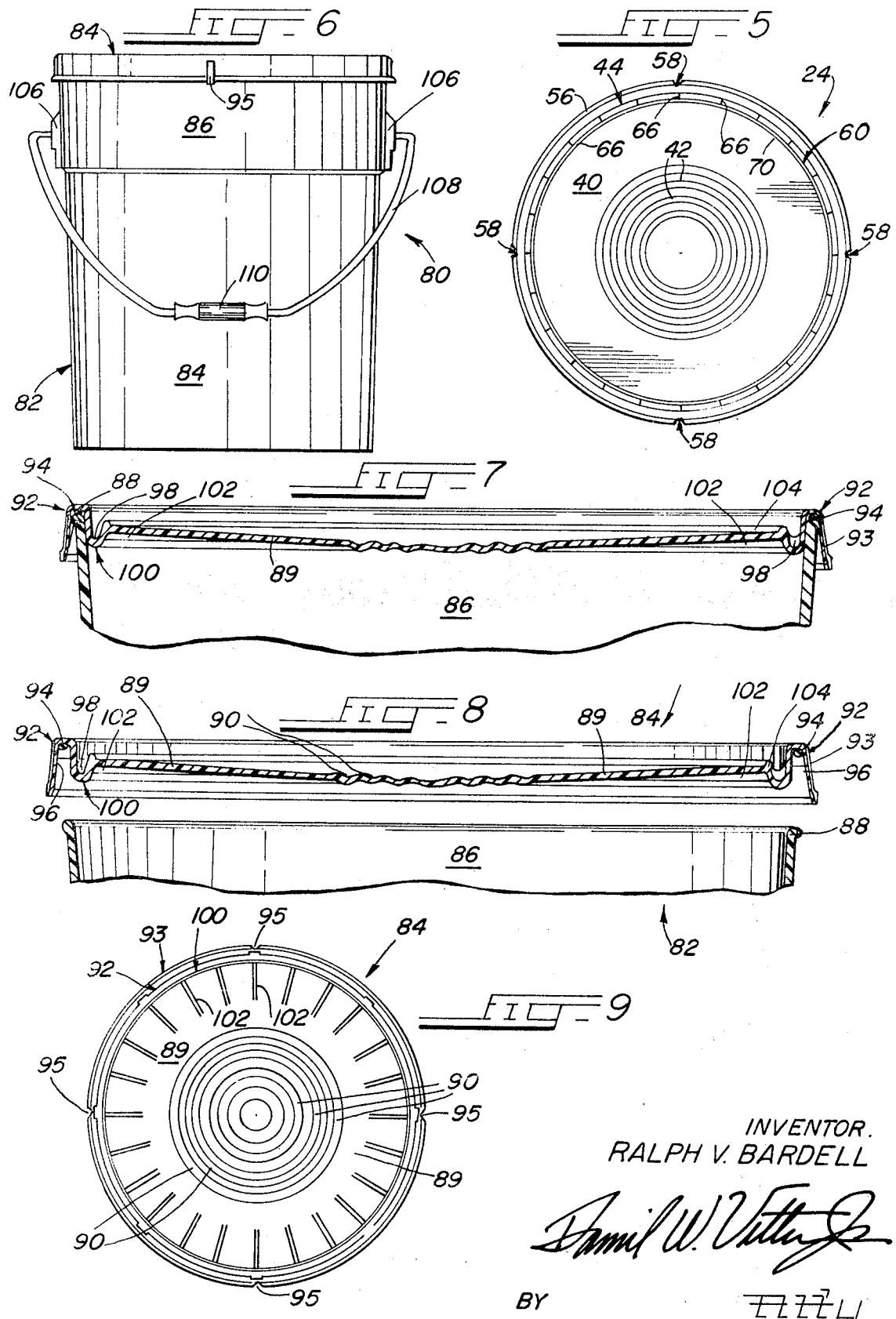

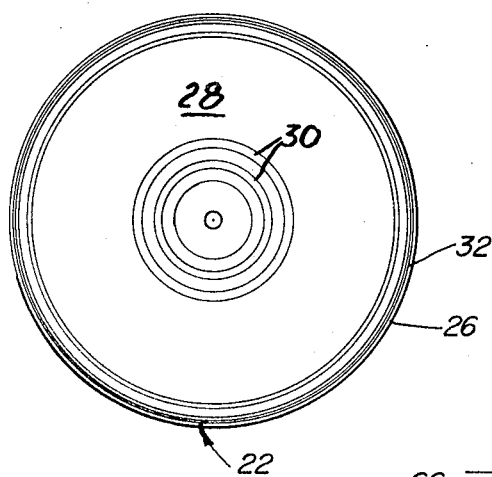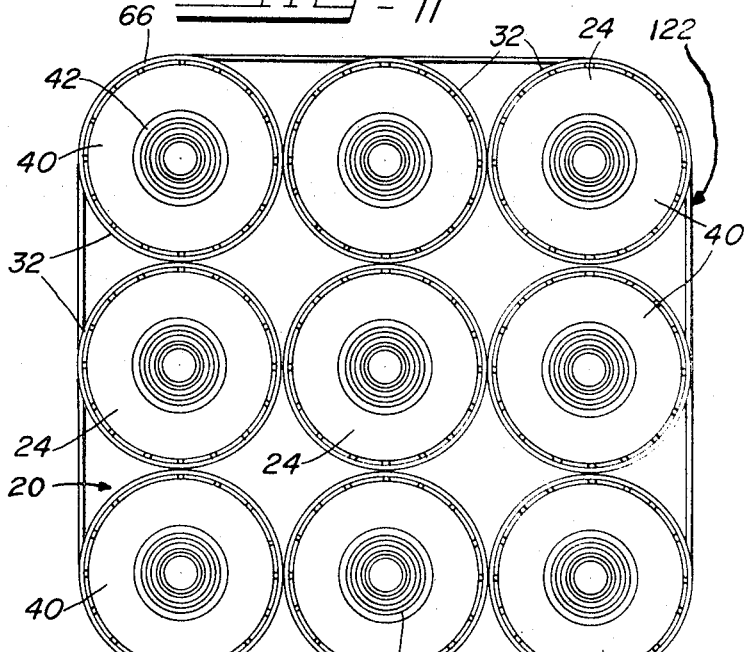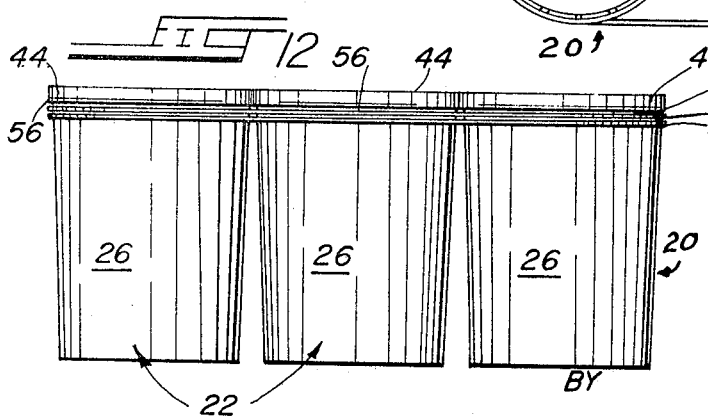

United States Patent Office 3,519,163
Patented July 7, 1970

3,519,163
CONTAINER AND CLOSURE THEREFOR
Ralph V. Bardell, Homewood, Ill., assignor to Growth International Industries Corporation, a corporation of Delaware
Filed Dec. 3, 1968, Ser. No. 780,718
Int. Cl. B65d 43/10
U.S. Cl. 220—60                    24 Claims

ABSTRACT OF THE DISCLOSURE

A plastic closure adapted for application to an open head container body comprises a perimetral inverted U-shaped channel provided at the periphery thereof, with the channel being formed by an inner flange, outer flange, and an integral interconnecting top section. Interlocking means, provided on the interior of the outer flange, are adapted to engage the side wall structure of the container body. Means are provided for separating the lower portion of the outer flange into separate sections in order to facilitate disengagement of the closure, with such means preferably taking the form of at least one vertical tear line severable with a screwdriver or the like.

BACKGROUND OF THE INVENTION

Field of the invention

This invention relates to the container arts and particularly to a plastic closure suitable for use with plastic and metal containers.

Description of the prior art

Although there has been considerable interest in the adaptation of plastic to containers and particularly shipping containers, the substitution of plastic for metal in the manufacture of such objects has encountered an appreciable number of problems. Certain plastics are soft and pliable materials, and when containers are made of such materials, it is difficult to provide a closure which will remain in sealed-tight engagement with the container when it is subjected to rough handling. On the other hand, buckets made of more rigid plastics tend to be fragile and easy to break under such circumstances.

More recently, there has been suggested a one-piece molded plastic lid featuring a depressed center section and a peripheral inverted U-shaped channel, with a detent lug formed on the inner side of the outer leg of the U-shaped channel, the said lug being adapted to lockingly engage a bead formed adjacent the open end of the container body. Although systems have of course been known for many years (see, e.g., U.S. Pats. Nos. 2,339,343 and 2,977,019), the more recent efforts to use such known design technology in a plastic container system have encountered much difficulty. While such an arrangement does provide a relatively secure seal (one of the objectives that must be achieved), by virtue of the design of the system and of the materials from which the closure is fabricated, removal of the sealed closure from the container body has been achieved only with great difficulty, often involving mutilation of the closure to such a degree that it cannot be reused.

It is therefore among the objects of the invention to provide a new and improved container closure of plastic material that can be readily applied by hand and can be removed with equal ease with only the use of simple tools.

Still another object of the invention is to provide a new and improved sealed container assembly wherein the sealed connection between the closure and the open end of the container consists of a multiple number of associated parts which reinforce each other and provide a high degree of stiffness at the open end of the container sufficient to withstand the usual rough handling to which shipping containers are subjected.

Still another object of the invention is to provide a new and improved sealed container assembly which is relatively simple in form and construction such that both the container and closure can be readily molded by conventional methods and wherein the number of parts comprising the seal is confined to substantially a minimum.

Yet another object is to provide a plastic container closure suitable for use on metal as well as plastic container bodies.

A further object is to provide a new one-piece, molded plastic container body for use with such a container closure.

Still further among the objects of the invention is to provide a new and improved sealed container assembly which is not only simple in construction, but also one which is inexpensive to manufacture and quick to apply whether made in small, medium, or large sizes.

SUMMARY OF THE INVENTION

The foregoing and other objects, advantages, and features of the present invention may be achieved with a closure adapted for removable placement over the open end of an open end container body having a side wall structure, the said closure comprising a central top wall structure and a perimetral inverted U-shaped channel provided at the periphery of the top wall structure, the said channel being defined by an inner flange, an outer flange, and an integral top section interconnecting the inner and outer flanges, interlocking means formed on the interior of the outer flange and adapted to lockingly mate with the side wall structure of the container body; and release means preferably taking the form of at least one vertically oriented tear line for separating the lower portion of the outer flange into separate sections to facilitate disengagement of the interlocking means from the side wall structure of the container body, whereby the closure may be separated from the container body.

DESCRIPTION OF THE DRAWINGS

FIG. 1 is a perspective view of a container and closure produced in accordance with the present invention;

FIG. 2 is a vertical sectional view taken through the center thereof;

FIG. 3 is an enlarged, fragmentary view of the upper portions thereof;

FIG. 4 is an exploded, fragmentary view of the upper portions thereof;

FIG. 5 is a top plan view thereof;

FIG. 6 is a front elevational view of another embodiment of the present invention;

FIG. 7 is an enlarged, fragmentary sectional view taken through the center of the upper portions thereof;

FIG. 8 is an exploded, fragmentary sectional view taken through the center of the upper portions thereof;

FIG. 9 is a top plan view thereof;

FIG. 10 is a bottom view of the container shown in FIG. 1;

FIG. 11 is a top plan view of a plurality of the containers shown in FIG. 1 arranged in a compact shipping and storage unit;

FIG. 12 is a side elevational view;

FIG. 13 is an enlarged, fragmentary view of the container and closure shown in FIG. 1;

FIG. 14 is an enlarged, fragmentary view of the closure of FIG. 1; and

FIG. 15 is an enlarged, exploded fragmentary view of the container and closure of FIG. 6.

DETAILED DESCRIPTION OF THE PREFERRED EMBODIMENTS

With reference to the drawings, FIGS. 1-5, 10, 13, and 14 illustrate a container unit 20 comprising an open head container body 22 and a closure 24 adapted to fit downwardly over the top end thereof.

Container body 22 and closure 24 are preferably formed from a suitable semi-rigid plastic having strength sufficient to withstand the abuses to which a shipping container is subjected in normal use. Linear, high density polyethylene is an especialy suitable plastic material, although other plastics of the polyolefin or petrochemical family may be employed. An especially preferred plastic is polyethylene having a density ranging between 0.941 and 0.965 gram per cubic centimeter (ASTM Test D-1505-60 T) and a melt index ranging between 0.1 and 9.0 (ASTM Test D-1238-57 T). Closure 24 may conveniently be molded from polyethylene-polypropylene copolymer. Of course, as will be obvious to those skilled in the art, container body 22 and closure 24 may be constructed or fabricated from various other materials.

Container body 22 comprises a generally cylindrical side wall structure 26 with a bottom wall structure 28 formed integrally therewith. A plurality of concentric grooves 30 are provided in the center of bottom wall structure 28 in order to strengthen it and to prevent molded-in stresses that develop as a result of shrinkage after the molded part is removed from the mold. Although side wall structure 26 is generally cylindrical, it preferably tapers inwardly from top to bottom in order that empty container bodies may be stacked in a nested fashion. A plurality of vertical stacking lugs 33 (see FIG. 1) are integrally molded on the side wall structure 26 to provide for "non-stick" nested stacking of the container bodies. The bottoms of lugs 33 of an upper container body rest on the open end of the container body of a lower container when they are so stacked.

An integrally formed, outwardly projecting flange 32 is formed near the open end of the container body, but spaced apart from the peripheral edge thereof. Flange 32 serves to strengthen and reinforce the open end of container body 22. In addition, since the outside diameter of flange 32 exceeds the diameter of the closure 24 at its widest point (see especially FIG. 3), flange 32 serves to protect the closure thereby further stabilizing the sealed container unit 20. Flange 32 also serves the function of gripping means for lifting the container.

Interlocking means taking the form of a perimetral, integrally molded bead 34 are molded on the side wall structure 26 between the flange 32 and the open end of side wall structure 26. In addition to providing an interlock with which the closure cooperates, bead 34 further serves to strengthen the open end of the container body due to the additional plastic material there present.

Closure 24 comprises a central, generally planar top wall structure 40, in which are provided a plurality of concentric grooves 42 similar in structure and in function to the concentric grooves 30 provided in the bottom wall strutcure 28 of container body 22. The provision of stress-relieving grooves 42 in top wall structure 40 is particularly valuable since they (along with similar grooves 30 in bottom wall structure 28) permit increases in pressure occurring within the sealed container unit (caused, for example, when a cooler layer of air between the sealed closure and the heated contents of the con'ainer is warmed or when the sealed container itself is heated) to be relieved via flexure of the grooves 42 and 30 rather than by distortion of the side wall structure or the closure or by separation of the closure from the container body.

The outer edge of the closure 24 takes the form of an inverted U-shaped channel 44 formed by an outer flange 46 and inner flange 48 interconnetced by a curved top section 50, which preferably conforms generally in configuration to the configuration of the top open edge of the container body. As best shown in FIG. 13, U-shaped channel 44 is adapted to fit downwardly over the open end of the side wall structure 26. Interlocking means, taking the form of an inwardly projecting integrally molded bead 52, are provided on the interior of flange 46. When bead 34 is positioned on the container body as shown in FIG. 3, bead 52 is provided adjacent the lower edge of flange 46 in order to provide an appropriate mechanical interlock when the closure 24 is applied to the container body 22.

While the interlock between the closure and container body preferably takes the form of the respective molded beads 34, 52 shown in FIGS. 4 and 13, other means for effecting a positive interlock between the closure and the container body may of course be employed in accordance with the teachings of the present invention. For example, a groove may be provided in the side wall structure of the container body into which the bead on the closure snaps or vice versa.

An integral bead 54 tapering to a knife edge is molded in the apex of channel 44 and bead 54 is adapted to resiliently contact the open end of the container body side wall structure when the closure is applied thereto in order to provide a fluid-tight seal between the closure and the container body. Of course, other sealing arrangements such as tubular gaskets, flowed-in gaskets, and the like may be provided within channel 44 in order to effect a fluid-tight seal between the closure and the container body.

A lip 56 is preferably provided adjacent the lower edge of flange 46. Because of the additional build-up of plastic adjacent the edge of flange 46 provided by lip 36 and the resultant additional shrinkage which occurs when closure 24 is removed from the mold, there is an inward shrinkage of the lower edge of flange 46 thereby serving to provide a firmer interlock between the closure and the container body and particularly between the beads 52, 34.

The lower inner edge of flange 46 is smoothly undercut to permit the insertion of a screwdriver or the like in order to facilitate removal of the closure 24 from the container body as hereinafter described in detail. In order to further facilitate the disengagement of bead 52 from bead 34, release means are provided preferably taking the form of at least one and preferably about four generally vertical tear lines 58 in the lower portion of flange 46. As best shown in FIGS. 1 and 13, tear lines 58 extend from the lower edge of flange 46 upwardly to a point above bead 52. As shown in FIG. 14, tear line 58 preferably takes the form of a triangular groove so that when a screwdriver or the like is wedged between the container body 22 and the flange 46, the flange separates along the tear line 58 thereby facilitating disengagement of the respective interlocking beads 34, 52 and permitting easy removal of the closure from the container body. After one or more of the tear lines 58 have been broken in removing the closure 24 from the container body, the closure may be reapplied to the container and sufficient strength is retained by the mechanical interlock that the container may be securely closed and provided with a dust-proof seal. Other forms of tear lines or means for vertically slitting the flange 46 may be employed. For example, a perforated line could be provided in place of the triangular groove shown in the drawings.

In order to further strengthen the sealed container unit, a U-shaped channel 60 is preferably disposed between the inverted U-shaped channel 44 and top wall structure 40. Channel 60 is preferably defined by a downwardly projecting flange 62 which is integrally joined with the top wall section 40 by a curved bottom section 64 which interconnects downwardly projecting flange 62 and inner flange 48. Thus, the peripheral edge of closure 24 provides a zig-zag or rippled configuration and the provision of same serves to substantially strengthen the closure and the container body as well.

A plurality of radial ribs 66 preferably are provided between downwardly projecting flange 62 and inner flange 48. In addition to serving to stabilize the closure 24, ribs 66 further serve to transfer stresses acting on the center of the closure (such as stresses provided by a container stacked above it) to the periphery thereof whereby they can be transmitted downwardly to the side wall structure of the container body.

A further feature of the present invention comprises an upstanding rim 70, which is preferably continuous with downwardly projecting flange 62. Rim 70 projects above the top wall structure 40 and provides a rim into which the lower end of a second container may be placed when they are stacked vertically in the sealed condition. Rim 70 thus serves a self-centering function resulting in an equalization of the distribution of the weight of the upper container.

As best shown in FIG. 4, the curved surface where bottom section 64 joins inner flange 48 and the undercut at the lower edge of flange 46 provide a self-centering arrangement whereby when the closure is placed downwardly over the open end of the container body, these curved surfaces serve to center the closure over the container body. In applying the closure, it need only be placed downwardly so that the interlocking bead 52 snaps under bead 34 thereby providing the sealed container unit.

When it is desired to open the container, a screwdriver or the like is merely inserted between flange 46 and the side wall structure 26 and the flange 46 is then slit along one or more of the tear lines 58. The lips 52 and 34 are then separated and the closure removed. As noted above, the closure may be reapplied even after the tear lines are severed in order to provide a resealed container unit.

A modified container unit 80 in accordance with the present invention is illustrated in FIGS. 6–9. Container unit 80 comprises a container body 82 and a closure 84. Container body 82 comprises a generally cylindrical side wall structure 84 and an integral bottom wall structure (not shown). As best shown in FIG. 6, the upper portion of the side wall structure 84 is thickened as indicated at 86, and the additional material provided in section 86 serves to reinforce the open end of the container body. An outwardly turned molded plastic bead 88 is provided at the open end of container body 82 and bead 88 further serves to reinforce and stabilize the open end of the container body.

The closure 84 differs from previously described closure 24 in order to permit it to interlock with the modified container body 82, but closure 84 nonetheless embodies the essential features of the subject invention. Thus, closure 84 comprises a generally disc-like top wall structure 89, in which are provided a plurality of concentric stress-relieving grooves 90, and an inverted U-shaped channel 92, including an outer flange 93, is provided at the periphery of closure 84. In place of the sealing bead 54 provided at the apex of groove 44 in closure 24, a separate resilient sealing gasket 94 is positioned in the apex of U-shaped channel 92, and gasket 94 is compressed between the apex of channel 92 and the bead 88 when the closure is applied to the container body in order to achieve a fluid-tight seal. An inwardly projecting bead 96 is provided on the interior of outer flange 93 forming U-shaped channel 92, and bead 96 is positioned at a distance spaced above the lower edge of flange 93 in order to provide an interlock with the bead 88 (see FIG. 15). Because of the location of bead 96 at a position spaced above the lower edge of flange 93 (compare the position of lip 52 on flange 46 as shown in FIG. 13), the undercut of the lower edge of the outer flange 93 is relatively greater in order to permit a deeper insertion of an opening tool such as a screwdriver or the like. A plurality of vertical score lines 95 are provided in flange 93, and, as shown in FIG. 15, score lines 95 extend above bead 96. Score lines 95 are severable in the same manner as previously described score lines 58 in order to facilitate removal of the closure from the container body.

Furthermore, in addition to a plurality of ribs 98 provided between the sides of a U-shaped channel 100 provided between inverted U-shaped channel 92 and top wall structure 89, a plurality of integrally molded radial ribs 102 preferably extend between the interior side of U-shaped channel 100 and top wall structure 89. Ribs 102 reinforce the closure and serve to distribute stresses from the interior to the exterior thereof. A centering flange 104 is provided at the periphery of top wall structure 89 in order to provide for easy centering of stacked container units, as previously described. Additionally, to facilitate the carrying of the container unit 80, a pair of integrally molded bail-retaining ears 106 are molded on container body 82 (see FIG. 6) and the ends of a wire bail 108, with a hand grip 110 mounted thereon, are fixed in ears 106.

In operation, the application of closure 84 to container body 82 occurs in substantially the same manner as previously described in connection with container unit 20, and the removal of the closure is likewise accomplished in a similar manner.

While the previously described embodiments of the present invention has been described with particular reference to cylindrical containers and closures, it will be obvious that the novel design features of the subject invention could as easily be embodied in rectangular or square container bodies and closures, as well as in other configurations.

A further feature of the present invention involves a novel system for banding together two or more containers such as container 20 in palletized units. As best shown in FIGS. 11 and 12, a number of such containers are banded together in horizontal groups by means of a band 122 formed of lightweight metal or plastic. The band is adapted to contact a side wall structure portion 26 of each of the containers adjacent the upper end thereof, and preferably along a point just above an outwardly projecting flange 32 which serves to prevent the band from slipping downwardly along the tapered side wall structures. In addition, because of the provision of a space between the upper edge of flange 32 and the lower edge of the closure channel 44 on the closures of containers 20, a properly dimensioned groove is provided into which the band 122 can be placed, with the closure and flange serving to prevent the inadvertent slippage or removal of the band from the series of containers. Preferably, the ends of the band 122 are held together or fastened by conventional means (not shown).

In accordance with the present invention, a novel and unique plastic closure suitable for use with container bodies preferably, but not necessarily, formed of plastic has been provided. The objectives of convenience and effectiveness in closing, opening, and reclosing the container, as well as economies and convenience of manufacture and use, have all been achieved with a system of surprising simplicity.

I claim:

1. A plastic closure adapted for removable placement over the open end of an open end container body having a side wall structure, the said closure comprising:
   a center top wall structure; and
   a perimetral inverted U-shaped channel provided at the periphery of the top wall structure and extending substantially entirely about the periphery thereof,
      the said U-shaped channel being formed by an inner flange, an outer flange, and a top section interconnecting the inner and outer flanges;
   interlocking means formed on the interior of the outer flange and adapted to lockingly engage the side wall structure of the container body; and release means for providing at least one separation in the lower portion of the outer flange in order to facilitate disengagement of the interlocking means from the side wall structure of the container body, whereby the closure may be separated from the container body.

2. A plastic closure adapted for removable placement over the open end of an open end container body having a side wall structure, the said closure comprising:
   a center top wall structure; and
   a perimetral inverted U-shaped channel provided at the periphery of the top wall structure,
      the said U-shaped channel being formed by an inner flange, an outer flange, and a top section interconnecting the inner and outer flanges;
   interlocking means formed on the interior of the outer flange and adapted to lockingly engage the side wall structure of the container body;
   the top wall structure including a downwardly projecting peripheral flange and an integral bottom section interconnecting the downwardly projecting peripheral flange and the lower edge of the inner flange whereby to form a U-shaped channel adjacent the inverted U-shaped channel in order to strengthen the closure; and
   release means for providing at least one separation in the lower portion of the outer flange in order to facilitate disengagement of the interlocking means from the side wall structure of the container body,
   whereby the closure may be separated from the container body.

3. A closure, as claimed in claim 2, and further comprising a plurality of transverse ribs integrally formed with the downwardly projecting flange, inner flange, and bottom section whereby to further strengthen the closure.

4. A closure, as claimed in claim 2, and further comprising an upwardly projecting lip in association with the top wall structure for centering a second container stacked thereon.

5. A closure, as claimed in claim 3, and further comprising a plurality of radial ribs formed integrally with the top wall structure and the downwardly projecting flange whereby to further strengthen the closure.

6. A closure, as claimed in claim 3, of generally annular configuration and provided with at least one concentric strength-imparting groove in the top wall structure thereof.

7. A closure, as claimed in claim 1, wherein the interlocking means comprises a bead formed on the interior of the outer flange.

8. A closure, as claimed in claim 7, wherein the bead is adapted to lockingly engage a bead formed on the side wall structure of the container body at a point spaced below the top edge thereof.

9. A closure, as claimed in claim 7, wherein the bead is adapted to lockingly engage a bead formed on the side wall structure of the container body at a point spaced below the top edge thereof.

10. A closure, as claimed in claim 1, wherein the release means comprises at least one vertical tear line formed in the outer flange.

11. A plastic closure adapted for removable placement over the open end of an open end container body having a side wall structure, the said closure comprising:
   a center top wall structure; and
   a perimetral inverted U-shaped channel provided at the periphery of the top wall structure,
      the said U-shaped channel being formed by an inner flange, an outer flange, and a top section interconnecting the inner and outer flanges,
      a knife-edged sealing bead being integrally molded in the apex of the inverted U-shaped channel;
   interlocking means formed on the interior of the outer flange and adapted to lockingly engage the side wall structure of the container body; and
   release means for providing at least one separation in the lower portion of the outer flange in order to facilitate disengagement of the interlocking means from the side wall structure of the container body,
   whereby the closure may be separated from the container body.

12. A closure, as claimed in claim 1, wherein a lip is integrally molded adjacent the lower edge of the outer flange.

13. A container assembly comprising:
   a plastic container body and a plastic closure therefor, the container body comprising:
      a side wall structure with a peripheral edge surrounding an open end;
      an integrally formed bottom wall structure;
      an outwardly projecting flange positioned at the upper end of the side wall structure but spaced apart therefrom; and
      first interlocking means on the side wall structure between the outwardly projecting flange and the peripheral edge of the side wall structure; and
   the closure comprising a central top wall structure:
      a peripherally continuous inverted U-shaped channel formed by an inner flange and outer flange and an interconnecting top section;
      second interlocking means on the interior of the outer flange and adapted to lockingly engage the first interlocking means on the said wall structure of the container body; and
      release means for providing at least one separation in the lower portion of the outer flange in order to facilitate disengagement of the second interlocking means from the first interlocking means,
   whereby the closure may be separated from the container body.

14. A container assembly, as claimed in claim 13, wherein the top wall structure of the closure includes a downwardly projecting peripheral flange and an integral bottom section interconnecting the downwardly projecting peripheral flange and the lower edge of the inner flange whereby to form a U-shaped channel adjacent the inverted U-shaped channel, whereby to strengthen the closure.

15. A container assembly, as claimed in claim 14, wherein the closure further comprises a plurality of transverse ribs integrally formed with the downwardly projecting flange, inner flange, and bottom section whereby to further strengthen the closure.

16. A container assembly, as claimed in claim 14, wherein the closure further comprises an upwardly projecting lip in association with the top wall structure for centering a second container stacked thereon.

17. A container assembly, as claimed in claim 15, wherein the closure further comprises a plurality of radial ribs formed integrally with the top wall structure and the downwardly projecting flange whereby to further strengthen the closure.

18. A container assembly, as claimed in claim 15, of generally annular configuration and provided with at least one concentric strength-imparting groove in each of the top wall and bottom structures thereof.

19. A closure, as claimed in claim 13, wherein the first interlocking means comprises a bead formed on the side wall structure of the container body adjacent the top edge thereof.

20. A closure, as claimed in claim 13, wherein the interlocking means comprises a bead formed on the side wall structure of the container body at a point spaced below the top edge thereof.

21. A container assembly, as claimed in claim 13, wherein the second interlocking means comprises a bead formed on the interior of the outer flange.

22. A container assembly, as claimed in claim 13, wherein the release means comprises at least one vertical tear line formed in the outer flange.

23. A container assembly, as claimed in claim 13, wherein a knife-edge sealing bead is integrally molded in the apex of the inverted U-shaped channel.

24. A container assembly, as claimed in claim 13, wherein a lip is integrally molded adjacent the lower edge of the outer flange.

References Cited

UNITED STATES PATENTS 3,421,654   1/1969   Hexel _____ 220—60

GEORGE T. HALL, Primary Examiner

U.S. Cl. X.R.

206—65; 220—23.4, 27, 97